United States Patent Office 3,133,899
Patented May 19, 1964

3,133,899
PREPARATION OF POLYARYLETHERS
Jack Kwiatek and Jay K. Seyler, Cincinnati, Ohio, assignors to National Distillers and Chemical Corporation, New York, N.Y., a corporation of Virginia
No Drawing. Filed Oct. 12, 1960, Ser. No. 62,100
3 Claims. (Cl. 260—47)

The present invention relates to a method for preparation of polymeric aryl ethers by oxidative coupling of thiobisphenols and more particularly, by oxidative coupling of alkyl-substituted thiobisphenols, in which each phenol group contains the OH group in the 4-position and is alkyl-substituted ortho to the OH group.

In accordance with this invention, a thiobisphenol, such as a solution thereof in an organic solvent containing an amine and copper chloride as a catalyst, is contacted with a free-oxygen containing gas. As to the phenol sulfide monomer to be polymerized to linear polyphenylene ethers by such a process, compounds of the following structure are employed:

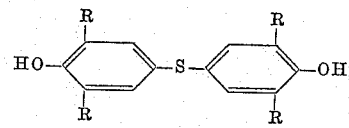

wherein at least one R in each phenol group is alkyl and the remaining R in each phenol group is hydrogen or alkyl. Preferably where R is an alkyl radical, it is such a radical of one to three carbon atoms.

By use of such monomers, it has been found that in the aforesaid process, oxidative coupling occurs to produce high molecular weight polymeric ethers substantially devoid of sulfur and comprised of units of the following structure:

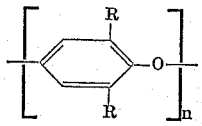

in which at least one R is alkyl and the other is hydrogen or alkyl.

Thus, by use of the aforesaid thiobisphenols in the process embodied herein, the oxidative coupling occurs with elimination of sulfur to produce polymers (of excellent temperature stability) of the aforesaid units.

As aforesaid, the polymerization reaction is carried out by contacting the monomer with a free oxygen-containing gas (e.g., oxygen, air), the monomer being in solution in an organic solvent containing pyridine and copper chloride. Any of many substances may be used as the solvent and which, for example, include nitrobenzene, pyridine, benzene, xylene, chlorobenzene, etc.

In practice of this invention, the reaction is carried out using from about 0.5 to about 10% by weight of copper chloride based on the weight of the sulfide monomer; and at least about two moles of pyridine per mole of copper chloride. If desired, the amine can be used as the solvent whereby it can be used in substantial excess over the aforesaid two moles per mole of the copper chloride.

Regarding the monomer, and although the invention is described more fully hereinafter with specific bisphenol sulfides (i.e., bisxylenol sulfide and bis-cresol sulfide), other bisphenol sulfides useful for polymerization by the process embodied herein include 3,3′-dimethyl-5,5′-diisopropyl-4,4′-dihydroxydiphenyl sulfide, 3,3′,5,5′-tetraethyl-4,4′-dihydroxydiphenyl sulfide, 3,3′-diisopropyl-4,4′-dihydroxydiphenyl sulfide, 3,3′-dimethyl-4,4′-dihydroxydiphenyl sulfide, 3,3′,5,5′-tetramethyl-4,4′-dihydroxy diphenyl sulfide, etc.

The reaction embodied herein can suitably be carried out at room temperature but, if desired, higher and lower temperatures can be used. Thus, as to higher temperatures, the process embodied herein can be carried out at 80° C. and higher.

In order to further describe the invention, the following embodiments are set forth for purposes of illustration and not limitation.

*Example I*

A solution of 18 ml. of dry pyridine and 60 ml. nitrobenzene was introduced into a 500 ml.-3-necked flask equipped with a "Vibro-Mix" agitator and inlet tube connected to an oxygen burette and oxygen supply. Following the introduction of 0.1 g. cuprous chloride, the solution was mixed in the oxygen atmosphere until oxygen absorption ceased. There was then introduced 2 g. (0.0073 m.) of bisxylenol sulfide and mixing continued under oxygen until uptake ceased. 93 ml. of oxygen was absorbed in 10 minutes (88 ml. the first 5 minutes). The reaction mixture was poured into 150 ml. methyl alcohol containing 1% of concentrated hydrochloric acid and the precipitate separated by decantation of the supernatant liquid. Two more precipitations from a chloroform solution of the polymer, with methyl alcohol gave 2.26 g. light tan precipitate. A transparent film was formed when a chloroform solution of the polymer was spread on a glass plate and allowed to dry.

The polymer thus produced had an intrinsic viscosity of 0.4 dl./g.

*Example II*

Following the procedure of Example I for the preparation of polymer from bisxylenol sulfide, there was obtained from 2 grams (0.00813 m.) of bis-cresol sulfide, 1.1 g. of a light yellow polymer. The total oxygen absorbed was 140 ml. in 33 minutes, and the polymer this produced had an intrinsic viscosity of 0.12 dl./g.

The polymers produced by the process embodied herein, are solids which, upon casting from a solution in chloroform, provide transparent film. Such polymers are particularly useful for applications requiring polymers of high hydrolytic stability, as, for example, for use as dielectrics, wire insulators, and the like.

While there are above disclosed but a limited number of embodiments of the invention herein presented, it is possible to produce still other embodiments without departing from the inventive concept herein disclosed, and it is desired therefore that only such limitations be imposed on the appended claims as are stated herein.

What is claimed is:

1. A process for preparation of polymeric aryl ethers which comprises contacting a solution containing a thiobisphenol, pyridine and copper chloride with a free oxygen-containing gas, said thiobisphenol having the formula

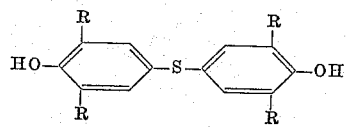

wherein at least one R in each phenol group is an alkyl group of 1 to 3 carbon atoms and the remaining R in each phenol group is selected from the group consisting of hydrogen and an alkyl group of 1 to 3 carbon atoms to produce by oxidative coupling a linear polyphenylene ether.

2. A process, as defined in claim 1, wherein said solution contains from about 0.5 to about 10% by weight of copper chloride based on the weight of the thiobisphenol and at least two moles of pyridine per mole of the copper chloride.

3. A process which comprises contacting a solution containing a thiobisphenol from the group consisting of bisxylenol sulfide and bis-cresolsulfide, pyridine and cuprous chloride with a free oxygen-containing gas to produce by oxidative coupling a high molecular weight linear polyphenylene ether, said solution being characterized by containing from about 0.5 to about 10% by weight of cuprous chloride based on the weight of the thiobisphenol and at least about two moles of pyridine per mole of the copper chloride.

References Cited in the file of this patent
UNITED STATES PATENTS 2,837,573    Mavity  ---------------- June 3, 1958

OTHER REFERENCES

Hay: J.A.C.S., vol. 81, pages 6335–6, December 1959, Library call No. QD.1.A5.